(12) United States Patent
Laura

(10) Patent No.: US 8,127,308 B1
(45) Date of Patent: *Feb. 28, 2012

(54) SYSTEM AND METHOD FOR ASYNCHRONOUS PROCESSING IN COBOL

(75) Inventor: Joseph G. Laura, Plano, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 731 days.

This patent is subject to a terminal disclaimer.

(21) Appl. No.: 12/180,264

(22) Filed: Jul. 25, 2008

Related U.S. Application Data

(62) Division of application No. 10/697,417, filed on Oct. 30, 2003, now Pat. No. 7,421,705.

(51) Int. Cl.
*G06F 9/44* (2006.01)
*G06F 9/46* (2006.01)

(52) U.S. Cl. .................................. 719/318; 718/100

(58) Field of Classification Search .................. 719/318; 718/100
See application file for complete search history.

(56) References Cited

U.S. PATENT DOCUMENTS 3,891,974 A    6/1975  Coulter et al.
(Continued)

OTHER PUBLICATIONS

Evans, et al., "Software Engineering for the COBOL Environment", ACM, 1982, pp. 874-882.
(Continued)

*Primary Examiner* — Andy Ho
*Assistant Examiner* — Abdou Seye

(57) ABSTRACT

The present disclosure provides a method for enabling events in a COBOL program, including maintaining, in a COBOL program, a index including a process identifier and an event associated with a child process. The method includes placing the child process in a wait state and signaling, by the COBOL program, the child process to run using the process identifier and the event associated with the child process. A system for coordinating processing in COBOL programs is also provided. The system includes a first COBOL program having a first routine for processing, a second COBOL program having a second routine for processing, and a module callable by the first and second COBOL programs. The module maintains a state sharable between the first and second COBOL programs to coordinate the processing of the first and second routines.

15 Claims, 4 Drawing Sheets

U.S. PATENT DOCUMENTS

| | | | | |
|---|---|---|---|---|
| 4,104,718 | A | * | 8/1978 | Poublan et al. ........................ 1/1 |
| 4,320,451 | A | | 3/1982 | Bachman et al. |
| 4,395,757 | A | * | 7/1983 | Bienvenu et al. ............ 718/104 |
| 4,525,780 | A | | 6/1985 | Bratt et al. |
| 4,636,948 | A | | 1/1987 | Gdaniec et al. |
| 5,721,876 | A | | 2/1998 | Yu et al. |
| 5,754,855 | A | | 5/1998 | Miller et al. |
| 6,073,157 | A | * | 6/2000 | Horiguchi et al. ............ 718/100 |
| 6,453,464 | B1 | | 9/2002 | Sullivan |
| 6,526,569 | B1 | | 2/2003 | Obin et al. |
| 7,206,805 | B1 | * | 4/2007 | McLaughlin, Jr. ............ 709/203 |
| 7,340,731 | B2 | | 3/2008 | Laura |
| 7,340,735 | B2 | | 3/2008 | Laura |
| 7,421,705 | B2 | | 9/2008 | Laura |
| 2005/0097537 | A1 | | 5/2005 | Laura |

OTHER PUBLICATIONS

Sneed, H., "Migration of Procedurally Oriented COBOL Programs in an Object Oriented Architecture", Software Maintenance, 1992 IEEE Conference, pp. 105-116, Nov. 1992.

Tomic, Marijana, "A Possible Approach to Object-Oriented Reengineering of COBOL Programs", ACM, Apr. 1994, pp. 29-34.

Zielinski et al., "A Tool for Monitoring Software-Heterogeneous Distributed Object Applications", 1995, IEEE, pp. 11-18.

Huang, et al., "Operating System Support for Flexible Coherence in Distributed Shared Memory", 1996, IEEE, pp. 92-101.

Haviland, Keith, Gray, Dina, Salama, Ben, Pearson Education Limited, "Unix System Programming, Second Edition", 1998.

Joiner, J.K., et al., "Re-engineering Legacy COBOL Programs", ACM, 1998.

Sridharan, et al., "On Building Non-Intrusive Performance Instrumentation in Blocks for CORBA-based Distributed Systems", 2000, IEEE, pp. 1-5.

"PERCobol Enterprise EditionV2.4: Programmer's Guide", Legacy J Corporation, Apr. 2000, pp. i-x, 90-05, 150-160, and 167-181, especially pp. 90-95.

Tao, et al., "Understanding the Behavior of Shared Memory Applications Using the SMiLE Monitoring Framework", Aug. 2000, SCI-Europe 2000, Munchen, Germany, pp. 1-6.

"PERCobol Evaluation and Review Guide: Getting Started", Legacy J Corporation, Jun. 2001, pp. 1-29, especially pp. 7-8.

"Micro Focus® Server Express TM Multi-threaded Programming", Sep. 2001 (online), accessed Jan. 25, 2007, Retrieved from internet URL:http://www.emunix.emich.edu/info/cobol/books/mtfmt.htm, 12 pages.

"Pro*COBOL Precompiler Programmer's Guide", Mar. 2002, Oracle Corp., Part No. A96109-01, pp. i-xxi, "2-1" through "2-32", and 12-1 through "12-22"; 75 pages.

"BEA Tuxedo"®, Programming a BEA Tuxedo Application Using COBOL, BEA Systems, In., Release 8.1, Jan. 2003, Chapters 1, 2 and 10, 104 pages., http://edocs.bea.com/tuxedo/tux81/pdf/pcb.pdf.

"BEA Tuxedo" ®, ATMICOBOL Function Reference, BEA Systems, Inc., Release 8.1, Jan. 2003, 47 pages, http://edocs.bea.com/tuxedo/tux81/pdf/rf3cbl.pdf.

"BEA Tuxedo"®, Using the ATMI/Q Component, BEA Systems, Inc., Jan. 2003, pp. i-xiv, "1-1 through :A-8".

Object Oriented COBOL, Fujitsu Computers—Siemens, Aug. 13, 2003, 1 page, www.fijutsu-siemens.com website.

Archive of—dBforums, dBforums Archive for comp.lang.cobol, Aug. 13, 2003, 11 pates, http://dbforums.com website.

Enterprise COBOL for z/OS and OS/390, IBM, Aug. 13, 2003, e pages, www-3.ibm.com website.

International Search Report, Application No. PCT/US04/35942, Apr. 5, 2005, 4 pages.

Written Opinion of the International Searching Authority, Application No. PCT/US04/35942, Apr. 5, 2005, 6 pages.

* cited by examiner

SYSTEM AND METHOD FOR ASYNCHRONOUS PROCESSING IN COBOL

CROSS-REFERENCE TO RELATED APPLICATIONS

This application is a divisional of, and claims priority to, U.S. patent application Ser. No. 10/697,417, now U.S. Pat. No. 7,421,705 B2 issued Sep. 2, 2008, entitled SYSTEM AND METHOD FOR ASYNCHRONOUS PROCESSING IN COBOL, inventor Joseph G. Laura, filed on Oct. 30, 2003, which is incorporated herein by reference for all purposes.

This application is also related to U.S. patent application Ser. No. 10/696,968, now U.S. Pat. No. 7,340,731 issued March 4, 108, entitled SYSTEM AND METHOD FOR COBOL TO PROVIDE SHARED MEMORY AND MEMORY AND MESSAGE QUEUES, inventor Joseph G. Laura; U.S. patent application Ser. No. 10/696,895, now U.S. Pat. No. 7,340,735 issued March 4, 108, entitled IMPLEMENTATION OF DISTRIBUTED AND ASYNCHRONOUS PROCESSING IN COBOL, inventor Joseph G. Laura; and U.S. patent application Ser. No. 10/696,828, entitled SYSTEM AND METHOD FOR DISTRIBUTED PROCESSING IN COBOL, inventor Joseph G. Laura, filed on October 30, 2003, all of which are incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the field of computer programs and computer programming languages and more specifically, but not by way of limitation, to implementation of distributed and asynchronous processing in COBOL.

BACKGROUND OF THE INVENTION

Common Business Oriented Language, or COBOL as it is more commonly known, is a computer programming language that has been in use for decades. COBOL is widely used for business applications on mainframe computer systems. COBOL was created to address the needs of business computing and is not generally used for writing system or low-level programs. COBOL applications can be hundreds of thousands or more lines of code that are used for years and evolve with periodic modifications and maintenance. Due to the huge investment in these large, business critical, COBOL applications, it is difficult for businesses to justify abandoning the COBOL applications for newer technologies.

Unfortunately, COBOL is severely limited in a number of areas compared to the processing techniques available to developers that use other languages such as C or JAVA. POSIX, or Portable Operating System Interface uniX, is a standard UNIX interface for applications to ensure interoperability on equipment from various venders. POSIX includes well know functionality available in programming languages such as C and JAVA for accomplishing distributed and asynchronous processing, such as shared memory, memory and message queues, threads, semaphores and mutexes, events, signal handlers, and sockets.

Shared memory and memory and message queues provide functionality to enable multiple C or JAVA programs, for example, to share resources. Threads refer to functionality to enables asynchronous processing to allow a program or application to be split into multiple paths to improve efficiency. Semaphores and mutexes relate to functionality to coordinate processing across jobs and threads, respectively. Events handle signals from other jobs, while signal handlers refer to the functionality for a program to manage exceptions, for example, from the operating system. Sockets provide programs the capability to share information across machines.

The processing techniques described above are examples of useful functionality widely available to programmers using distributed and asynchronous processing languages, such as C and JAVA, but unavailable in COBOL. Frequently, it is desirable for business processes employing COBOL applications to accomplish distributed and asynchronous processing. Although the COBOL language has limitations, it is difficult for businesses with a significant investment in COBOL programs to justify abandoning the COBOL applications and redeveloping the applications using a more modern and flexible language, such as C or JAVA. Instead, COBOL systems are typically provided with an interface or "hook" to enable the COBOL program to cooperate with, for example, C or JAVA programs. The C or Java program then performs the distributed and asynchronous processing tasks that the COBOL application is otherwise incapable of handling independently.

SUMMARY OF THE INVENTION

The present disclosure provides a method for enabling events in a COBOL program, including maintaining, in a COBOL program, a index including a process identifier and an event associated with a child process. The method includes placing the child process in a wait state and signaling, by the COBOL program, the child process to run using the process identifier and the event associated with the child process. A system for coordinating processing in COBOL programs is also provided. The system includes a first COBOL program having a first routine for processing, a second COBOL program having a second routine for processing, and a module callable by the first and second COBOL programs. The module maintains a state sharable between the first and second COBOL programs to coordinate the processing of the first and second routines.

In one embodiment, a method for employing semaphores to coordinating processing in COBOL programs is provided. The method includes processing by a first COBOL program to a shared resource, and processing by a second COBOL program to the shared resource. The method further provides for maintaining a state sharable between the first and COBOL programs to coordinate the processing by of the first and second COBOL programs to the shared resource.

In another embodiment, a method of employing threads in COBOL programs is provided. The method includes outputting by a first COBOL program to a block of shared memory, and outputting by a second COBOL program to the block of share memory. The method provides for writing, by a COBOL routine, the output of the first COBOL program to a shared resource, and writing, by the COBOL routine, the output of the second COBOL program to the shared resource.

In another embodiment, a method for a COBOL program to use signal handlers is provided. The method includes registering, by a COBOL language program, a signal handler with an operating system, the signal handler associated with an event The method further provides for executing, by the operating system, the signal handler on the event occurs. In still another embodiment, a system for coordinating processing in COBOL is provided. The system includes a COBOL program desiring to process a first and second tasks to a shared resource and a module in communication with the COBOL program and maintaining a shared state between the first and second tasks to coordinate processing to the shared resource. The COBOL program and module operating in the same runtime environment.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

It should be understood at the outset that although an exemplary implementation of one embodiment is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Figure 1:
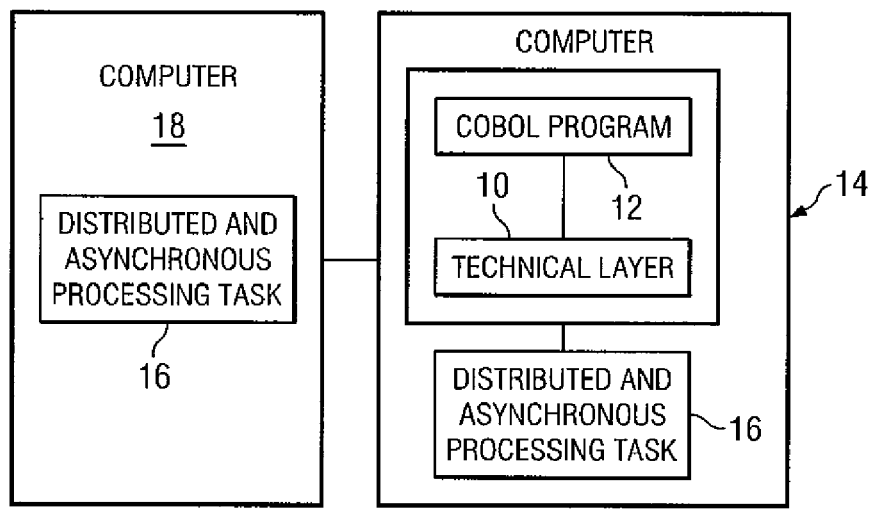
FIG. 1 is a block diagram illustrating one embodiment of a system for implementing distributed and asynchronous processing using a COBOL program.

FIG. 1 is a block diagram illustrating one embodiment for implementing distributed and asynchronous processing in COBOL. To the domestic and international COBOL programming community, enabling distributed and asynchronous processing for the COBOL programming language is a significant achievement that enables a new paradigm for COBOL applications and programmers, whether for mainframe or PC COBOL systems.

The exemplary embodiment enables distributed and asynchronous processing by employing a technical layer 10. A COBOL program 12 is provided, along with the technical layer 10, on a computer 14. The COBOL program 12 may be any type of computer program written in the COBOL programming language, regardless of the version, vendor, level of compliance with the COBOL ANSI standard, specific compiler or operating system features of the COBOL system. The COBOL program 12, in this embodiment, is a COBOL application or program, or may be a COBOL routine, paragraph, subroutine, subtask or other instructions coded in the COBOL programming language. The computer 14, in this embodiment, is a mainframe computer system. The present disclosure, however, should not be limited to mainframe computers and may be implemented, in other embodiments, on a mid-range computer system, network server or workstation, or desktop or other computers.

The COBOL program 12 is programmed to execute a call to one or more callable modules or routines (not shown) of the technical layer 10 to perform distributed and asynchronous processing tasks 16 on the computer 14. The computer 14 is shown in communication with a second computer 18, which may be similar to the computer 14. In this manner, the COBOL program 12 using the technical layer 10 is operable to enable the distributed and asynchronous processing tasks 16 on the second computer 18 as well.

Figure 2:
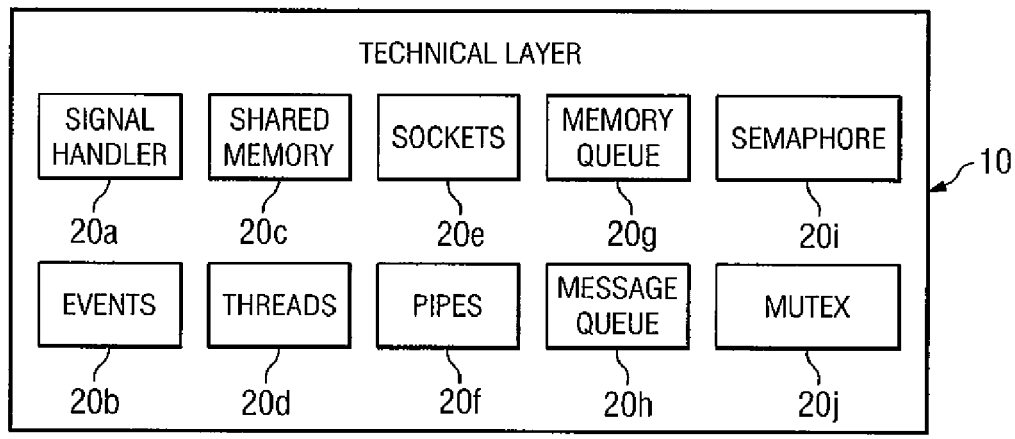
FIG. 2 is a block diagram illustrating one embodiment of a technical layer having a plurality of routines to enable distributed and asynchronous processing in COBOL programs.

In this embodiment, the technical layer 10, which will be described in greater detail hereinafter with regard to FIG. 2, is implemented as a library having one or more callable modules, routines or subroutines usable by the COBOL program 12, such as by being linked into the COBOL program 12. In other embodiments, the callable modules or routines of the technical layer 10 may be integral or incorporated into the COBOL program 12. In yet other embodiments, the technical layer 10 may be employed as a pre-compiler, such that routines or functions enabling the distributed and asynchronous processing functionality are enabled prior to the COBOL program 12 being compiled. In still other embodiments, the technical layer 10 may be enabled as part of a COBOL compiler, such that the asynchronous and distributed processing functionality for the COBOL program 12 are enabled by the COBOL compiler during compilation.

As discussed above, distributed and asynchronous processing is intended to describe a variety of functionality that is not native to COBOL or was not previously available to in the COBOL programming language, but which is available in distributed and asynchronous processing environments and programming languages such as C and Java. The terms distributed and/or asynchronous processing, as used herein, are intended to include, but not be limited to, one or more of the programming techniques and functionality for programming, enabling, and managing sockets and pipes, shared memory, threads, memory and message queues, signal handlers, events, semaphores and mutexes.

Technical Layer

FIG. 2 is a block diagram illustrating one embodiment of the technical layer 10 for enabling distributed and asynchronous processing by COBOL language programs, such as the COBOL program 12. The technical layer 10, when enabled as a COBOL library, may be written in the COBOL programming language as a plurality of paragraphs, routines, or modules callable by the COBOL program 12 and linked to the COBOL program 12 at the appropriate time. However in other embodiments, the technical layer 10 may be written in a variety of other languages, such as, but not limited to, assembly language. Nothing in this disclosure should be regarded as limiting or restricting the particular construction or techniques used to implement the technical layer 10. As previously discussed, the technical layer 10 may be implemented, in other embodiments, as a compiler that enables distributed and asynchronous processing routines, functions, or program code of the COBOL program 12 or its sub-programs.

Based on the present disclosure, one skilled in the art would readily identify a number of ways to enable distributed and asynchronous processing in COBOL language programs. Thus, although the technical layer 10 in the present embodiment is provided as a COBOL language program library, each of the various routines and instructions for enabling each of the distributed and asynchronous processes may be implemented as individual programs or systems or separated into different combinations, all of which are within the spirit and scope of the present disclosure.

In addition, the technical layer 10 may be embodied as one or more layers or sub-layers, systems or subsystems, which may be beneficial in some aspects for ease of maintenance and for adaptation to other systems for reasons of compatibility, performance or efficiency. For example the technical layer 10 may include an operating system calls layer (not shown). Such an operating system layer may be provided for handling specific operating system calls from the technical layer 10 to a particular mainframe or computer operating system. Thus, an operating system layer allows the technical layer 10 to be independent of any particular operating system. This implementation simplifies migration to different mainframe or other computer operating systems without the need to completely replace or rewrite the technical layer 10 for operation on another operating system. Whether or not an operating system layer is employed, the technical layer 10 insulates the COBOL program 12 from the operating system, making the COBOL program 12 operating system independent and readily portable to other operating systems and platforms.

The technical layer 10 has a plurality of routines 20 including, but not limited to, routines for enabling distributed and asynchronous processing by COBOL language programs, such as POSIX functionality available in other languages. The plurality of routines 20 of the technical layer 10 are designated alphanumerically for purposes of clarity for this disclosure. The plurality of routines 20 include a signal handler routine 20a, an events routine 20b, a shared memory routine 20c, a threads routine 20d, a sockets routine 20e, a pipes routine 20f, a memory queue routine 20g, a message queue routine 20h, a semaphore routine 20i, and a mutex routine 20j.

Briefly, the signal handler routine 20a provides functionality to enable the COBOL program 12 to work with operating system generated events. The events routine 20b enables the COBOL program 12 to manage signals from other jobs. The shared memory routine 20c provides the COBOL program 12 with the functionality to enable memory sharing on the computer 14, or other computers, with other COBOL programs. The threads routine 20d enables COBOL applications to be split into multiple paths. The sockets routine 20e enables the COBOL program 12 to communicate information between, for example, the computer 14 and the second computer 18, via a socket connection. The pipes routine 20f provides functionality to enable the COBOL program 12 to communicate via pipe connections on the computer system 14.

The memory queue routine 20g and message queue routine 20h provide functionality to enable the COBOL program 12 to use memory queues on the computer 14, as well as message queues employed by and between computer systems. The semaphore routine 20i provides functionality to coordinate processing across jobs, while the mutex routine 20j enables COBOL language programs to coordinate processing across threads. The term job includes instructions sent in a batch manner to a computer as a unit of work to be accomplished by the computer. The term threads includes a sequence of computer instructions that make up a program such that multiple threads can be executed independently to improve program efficiency.

Each of the routines 20 of the technical layer 10 may be employed individually or in various combinations or in the combination illustrated in FIG. 2. As such, each of the individual routines 20 or combination of routines 20 may be enabled in a number of ways including, but not limited to: provided as a library linkable to the COBOL program 12; provided as routines that are nested, embedded or otherwise included in the COBOL program 12; provided in a pre-compiler configuration where the functionality of the routine 20 is in enabled in the COBOL program 12 during a process prior to compilation; or provided as a COBOL language compiler where the functionality provided by the routine 20 is enabled during compilation of the COBOL program 12. In any case, the present disclosure enables asynchronous and distributed processing by one or more COBOL programs or routines either independently or employing associated systems, such as but not limited to the above described list, within the COBOL programming language or the same runtime environment. Other methods of enabling one or more of the distributed and asynchronous processing capabilities disclosed herein will readily suggest themselves to one skilled in the art.

In the present embodiment, the routines 20 are provided as part of the technical layer 10 in a library that is easy to maintain and adapt as necessary. Such implementation allows for the library to be readily packaged for use by other COBOL language developers and may be distributed including the source code or may be distributed only as object code. In either case, the COBOL language programmers can easily employ the technical layer 10 as a library without changes to the underlying COBOL language system and quickly begin using the distributed and asynchronous processing functionality provided in the present disclosure.

Sockets and Pipes

Figure 3:
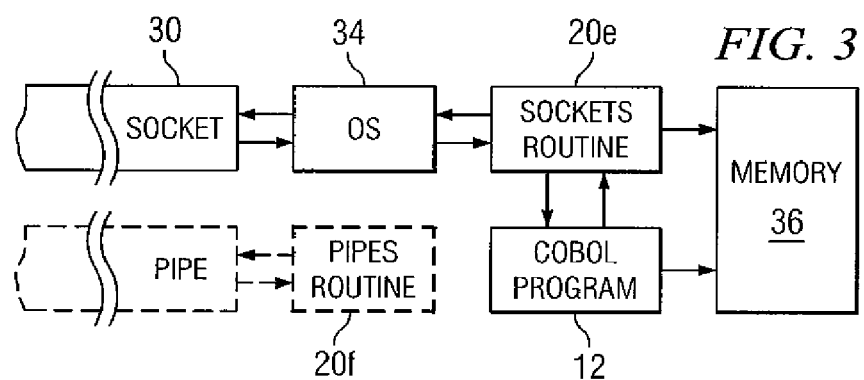
FIG. 3 illustrates one embodiment of a socket routine of the technical layer for enabling socket communications by COBOL programs.

FIG. 3 is a diagram illustrating the functionality of the socket routine 20e for enabling the COBOL program 12 for communication with a socket 30. The socket 30 may represent a communication channel established between one or more computer systems, such as the first computer 14 and the second computer 18 (illustrated in FIG. 1). Functionally, the COBOL program 12 requests communication, via a socket, from the socket routine 20e. The socket routine 20e establishes the socket connection with the socket 30, such as by a call to an operating system 34. The operating system 34 may be any operating system operable on the computer 14. In the present embodiment, the COBOL program 12 is operable on an IBM mainframe computer system using a zOS operating system.

The COBOL program 12 may, for example, initiate a call to a function of the operating system 34 to accept a connection request from a client. Examples of such calls are provided in the operating system's callable services reference manual. It may be necessary to refer to the specific documentation for the operating system where the technical layer 10 and COBOL program 12 will be employed to determine the correct syntax and functionality. The operating system calls, including the syntax and techniques for the COBOL program 12 to communicate with the operating system 34 via the technical layer 10, may vary greatly depending upon the desired operating system. As previously described, the technical layer 10 may be separated into multiple layers including an operating system layer that maintains each of the operating system calls for compatibility with specific operating systems. As such, the technical layer 10 would require little or no modification to enable compatibility with other operating systems. By abstracting the specific calls to a single layer, the technical layer 10 and COBOL program 12 remain substantially the same regardless of the operating system, thus eliminating or reducing the need to maintain different versions of the technical layer 10 or COBOL program 12 for different operating systems. Regardless, any change in the technical layer 10 to accommodate different operating systems would be transparent to the COBOL programs using the technical layer 10.

In the present embodiment, and referring to the above described operating system documentation, the "accept (BPX1ACP)" is the appropriate call to accept a connection request from a client. This operating system function extracts the first connection on the queue of pending connections, creates a new socket with the same properties as the specified socket and allocates a new descriptor for that socket, as provided in the documentation. If there are no connections pending, the service either blocks until a connection request is received, or fails with an EWOULDBLOCK, depending upon whether the specified socket is marked as blocking or non-blocking. Thus, the socket routine 20e is operable, via the operating system 34, to establish and communicate via the socket 30. It will be appreciated that a number of operating system calls and communications are employed by the routines 20 of the technical layer 10. For purposes of clarity and brevity of disclosure, only the above operating system call and function is described. The specifics for additional operating system calls and functions may be obtained by referring to the above or desired operating system documentation and relevant COBOL programming language support materials.

The operating system call is made from the socket routine 20e, which, in the present embodiment, is a program written in COBOL having a routine or paragraph wherein a call is made in the COBOL code to the operating system 34 as described above. The called operating system function returns information used by the socket routine 20e for these purposes. For example, the above call is described in the documentation as follows:

CALL BPX1ACP,
(Socket_descriptor,Sockaddr_length,Sockaddr,Return_value,Return_code, Reason_code)

The actual implementation of the operating system calls will vary depending upon the different functionality enabled in various portions of the technical layer 10. Regardless of the specific operating system call, technique for making the call, and whether or not the call is made from a COBOL language program, it is readily apparent that enabling a technical layer 10 for use by a COBOL program allows the COBOL program to accomplish communication with the socket 30. In light of the above description, one skilled in the art can see that using operating system calls from COBOL programs or routines could also be used to make other calls to the operating system 34, as well as other operating systems, and for brevity only the above call will be described in detail.

When the technical layer 10 is programmed in COBOL, as is the case in the present embodiment, the operating system calls require bit level mapping of the calls, parameters and returned information to complete a COBOL programming language call to the operating system 34. Some operating system calls may be accomplished otherwise. However, the present embodiment employs the bit level calls to communicate with the operating system to enable the COBOL program to look like an assembler call, as necessitated by the operating system. As such, the call to the operating system 34 has the correct bits, offsets and memory mapping to sufficiently interface with the operating system 34. As previously discussed, these specific bit level calls, including offsets, will depend upon the particular operating system 34 that is being employed.

Source code for the socket interface call from a COBOL language program, according to the present embodiment, is provided below. A number of interesting aspects of the code are apparent, including that the code provides a nested program called GETADDR that provides the address of an internal area into a pointer variable. This address is moved into an external area prior to making the socket call. This is one method for circumventing a limitation of the COBOL compiler that restricts setting pointer addresses to areas that are in linkage. Using the external area to communicate the address of the requesting program's socket communication area allows the program to be used in either 5 or 32 bit mode, which may also be referred to as above or below the line.

```
01 WS-SOCKET-AREA.
    02 WS-SOCKET-ACTION           PIC X(1).
    02 WS-SOCKET-FD.
       05 WS-SOCKET-FD-NUM        PIC 9(9) COMP.
    02 WS-SOCKET-IPADDR.
       05 WS-SOCKET-IPADDR-N       PIC 9(9) COMP.
    02 WS-SOCKET-OCTETS REDEFINES WS-SOCKET-IPADDR.
       05 WS-SOCKET-IPADDR-B OCCURS 4 TIMES
          INDEXED BY WS-SOK-IP-IDX PIC X(1).
    02 WS-SOCKET-PORT             PIC 9(9) COMP.
    02 WS-SOCKET-INPUT-LEN        PIC 9(4) COMP.
    02 WS-SOCKET-INPUT-NAME-AREA.
       05 WS-SOCKET-INPUT-NAME    PIC X(10).
       05 FILLER                  PIC X(1) VALUE 'I'.
       05 WS-SOCKET-INPUT-PID     PIC 9(09).
    02 WS-SOCKET-OUTPUT-LEN       PIC 9(4) COMP.
    02 WS-SOCKET-OUTPUT-NAME-AREA.
       05 WS-SOCKET-OUTPUT-NAME   PIC X(10).
       05 FILLER                  PIC X(1) VALUE 'O'.
       05 WS-SOCKET-OUTPUT-PID    PIC 9(09).
    02 WS-SOCKET-IN               PIC S9(9) COMP.
    02 WS-SOCKET-OUT              PIC S9(9) COMP.
    02 WS-CLIENT-FD               PIC S9(9) COMP.
    02 WS-SOCKET-CHARS-IO         PIC S9(9) COMP.
    02 WS-SOCKET-REC-LEN          PIC S9(9) COMP.
    02 WS-SOCKET-REC.
       05 WS-SOCK-CHAR OCCURS 100000 TIMES
                      PIC X(1).
01 WS-POINTERS.
    02 WS-SOCKET-INTF-PTR POINTER.
    02 CL-CLIENT-INTF-PTR POINTER.
    02 SZ-CLIENT-INTF-PTR POINTER.
    02 RM-CLIENT-INTF-PTR POINTER.
01 EX-SOCKET-INTF-AREA EXTERNAL.
    02 EX-SOCKET-INTF-PTR         POINTER.
CALL 'GETADDR' USING WS-SOCKET-AREA,
                     WS-SOCKET-INTF-PTR.
SET EX-SOCKET-INTF-PTR    TO    WS-SOCKET-INTF-PTR.
PERFORM V1000-CALL-SOCKET-INTERFACE.
```

-continued

```
PERFORM C1000-CHECK-RETURN-CODE.
******************************************
*    CALL SOCKET INTERFACE ROUTINE
******************************************
V1000-CALL-SOCKET-INTERFACE.
    CALL 'HHABSSOK'.
LINKAGE SECTION.
01 WS-AREA               PIC X(1).
01 WS-ADDR               POINTER.
PROCEDURE DIVISION USING WS-AREA
                         WS-ADDR.
MAIN.
    SET WS-ADDR TO ADDRESS OF WS-AREA.
    GOBACK.
END PROGRAM GETADDR.
```

In other embodiments, the technical layer 10 may be implemented wherein the specific syntax from the COBOL language program is separated with the EXEC/END-EXEC and the syntax is stripped out of the source COBOL language program in a pre-compile step and replaced with calls to the technical layer 10. In addition, the operating calls and/or routines 20 may be provided in a COBOL language compiler as previously discussed.

Once the socket routine 20e establishes the connection with the socket 30, via the operating system 34, the socket routine 20e is then operable to read and write information from the socket 30. The socket routine 20e receives information from the socket 30 and writes the information to a memory 36, such as a block of memory of the computer 14. In the present embodiment where the computer 14 is a mainframe, the socket routine 20e receives the information from the socket 30 and is operable to convert the information based on the formats of the sending and receiving platforms. For example, the socket routine 20e may receive the information in ASCII format and convert the information to EBCDIC format for use on a mainframe, or vice-versa.

The COBOL program 12 then reads the information from the memory 36 thus enabling the COBOL program 12 to communicate via the socket 30. In some embodiments, the COBOL program 12 allocates the memory 36, and thus obtains the address of the memory 36. In the present embodiment, the socket routine 20e establishes the memory 36 and the COBOL program 12 obtains the address of the memory 36 from the socket routine 20e. In either case, the COBOL program 12 uses the address of the memory 36 and lays a map over the memory 36 to read the information from the memory 36. One method of accomplishing this technique is for the COBOL program 12 to employ a copybook for reading the memory 36 information into the COBOL program 12.

In the present embodiment, the socket routine 20e creates the socket 30 and may be thought of as providing a file descriptor that describes a stream. The socket routine 20e obtains or is provided the address or the target where the data or information coming off the socket 30 should be provided. The COBOL program 12 maps the address of the memory location 36 to the working storage section of the COBOL program 12. The COBOL program 12 can then analyze the information obtained from the socket 30 in any desirable manner. Thus, the socket routine 20e reads the data streaming off the socket 30 and writes the data to a file or memory for access by the COBOL program 12. The socket routine 20e and the COBOL program 12, in this embodiment, cooperate to synchronize this activity by the COBOL program 12 requesting that the socket routine 20e read additional data off the socket 30 each time the COBOL program 12 finishes reading or manipulating the data previously written to the file or memory from the socket routine 20e. The present embodiment illustrates the additional functionality and flexibility provided by this socket routine 20e, and which is also provided by the pipes routine 20f that will be described hereinafter, to enable COBOL programmers the ability to accomplish, for example, messaging in a distributed environment.

To write to the socket 30, the COBOL program 12 may, in one embodiment, write the information or data to the memory 36 or provide the information directly to the socket routine 20e. After receiving the information, the socket routine 20e writes, via the operating system 34, the information to the socket 30. To accomplish the various socket 30 related functions, the socket routine 20e is provided with a number of functions callable from the COBOL program 12 or enabled by the technical layer 10, including a create function to create a new socket, an attach function to attach to existing sockets, and an open function to open the socket 30.

Other functions of in the socket routine 20e include a write function to write data into the socket 30 and a block function to prevent writing to the socket 30 when the socket 30 is full. The socket routine 20e includes a read function to read data from the socket 30, substantially as described above. A remove function enables the socket routine 20e to remove sockets 30 from the system, and a delete function is operable to delete sockets where the socket 30 has not yet been opened. In the present embodiment, the socket routine 20e also includes a listening port function that allows the socket routine 20e to monitor the socket 30 for communications and additional functionality for managing the connection of the socket 30. A number of the socket functions described above may be enabled via operating system calls, for example, from the socket routine 20e to enable socket communications.

The pipes routine 20f functions and operates in a manner substantially similar to that of the socket routine 20e. Sockets are essentially communications between separate machines whereas pipes are essentially communications on the same or local machine. For reasons of brevity, the pipes routine 20f will not be described in detail due to the similarities in construction and function of the pipes routine 20f and the socket routine 20e. The modifications necessary to enable the pipes routine 20f are based on the local nature of pipes and will be apparent to one skilled in the art. The pipes routine 20f also includes functionality, for example, to prevent reading from an empty pipe, prevent writing to a full pipe, and waiting before writing to a full pipe as well as balancing where one or more of the pipes are full.

The pipes routine 20f provides COBOL programmers the ability to accomplish asynchronous processing by reading and writing to multiple pipes and enabling multiple child processes to simultaneously read information from pipes. The pipes and sockets functionality was heretofore unavailable to COBOL programmers. Previously COBOL programs were only able to read from a file, such as a database or an index sequential file or VSAM file, and were not provided with the functionality to read, manage and write information from socket and pipe connections.

Threads

Figure 4:
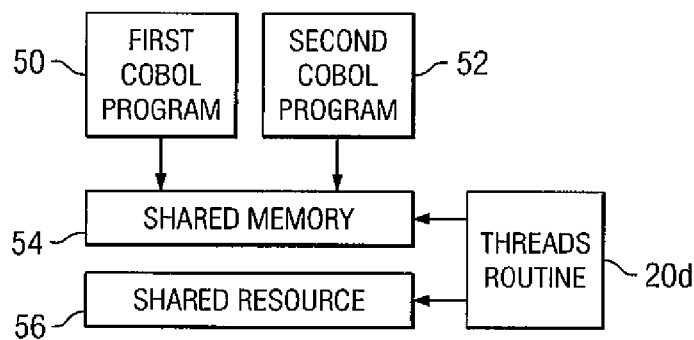
FIG. 4 is a block diagram illustrating one embodiment of a thread routine of the technical layer for enabling threads in COBOL programs.

FIG. 4 is a block diagram illustrating the threads routine 20d of the technical layer 10. Threads provide for asynchronous processing by multiple processes simultaneously. The threads routine 20d achieves the functionality of native threads, as used in C and Java, and enables them for the COBOL language by employing and managing subtasks, as described below, which were not previously used by COBOL programs in this manner. The threads routine 20d enables COBOL applications to be split into multiple paths. FIG. 4 illustrates a first COBOL program 50 and a second COBOL program 52, which are both similar to the COBOL program 12 illustrated in FIG. 1. The threads routine 20*d* allows the first and second COBOL programs 50 and 52 to use a shared memory 54 to enable threads for COBOL. The operation and function of shared memory will be discussed in greater detail hereinafter with regard to FIG. 7.

In the present embodiment, the first and second COBOL programs 50 and 52 write an output to the shared memory 54. The threads routine 20*d* is operable to read the information written to the shared memory 54 by the first and second COBOL programs 50 and 52 and write the information to a shared resource 56. Using COBOL language program calls to the operating system 34, for example, the threads routine 20*d* enables the first and second COBOL programs 50 and 52 to operate as asynchronous subtasks wherein both the first and second COBOL programs 50 and 52 use the same address space, but employ distinct process ID numbers. Distinct process ID numbers would be used in the present embodiment where the system is operating on a mainframe computer system. In this environment, only one of the first and second COBOL programs 50 and 52 would be able to write to the shared resource 56 without causing a conflict. The present system resolves this potential for conflicts by employing the mutex routine 20*j*, which will be discussed in greater detail hereafter. The mutex routine 20*j* protects the shared memory 54 so that both the first and second COBOL programs 50 and 52 can write information to the shared memory 54, which is eventually written to the shared resource 56 by the threads routine 20*d*. This function allows the first and second COBOL programs 50 and 52 to both output, although indirectly, to the shared resource 56. The mutex routine 20*j* also functions to serialize the transfer of the information written to the shared memory 54 out to the shared resource 56, eliminating the potential for conflicts when outputting to the shared resource 56.

In addition, the threads routine 20*d* is operable to detect when a subtask goes down, or has some other type of failure. The thread routine 20*d* is further operable to restart the subtask. In a mainframe environment when a subtask abruptly ends, no messages or events provide notice or warning to indicate that the subtask has ended. The threads routine 20*d* monitors and detects when a subtask, such as the first and second COBOL programs 50 and 52, ends and is further operable to restart the subtask, by using the process ID assigned to the subtask. In addition the threads routine 20*d* is operable to maintain a log to track information, such as but not limited to, the information written from the first and second COBOL programs 50 and 52 to the shared memory 54. The log may also maintain the process ID's of the first and second COBOL programs 50 and 52 and the information and data written by the threads routine 20*d* to the shared resource 56. This information is useful for operation of the threads routine 20*d*, as well as for developers and administrators to track program events.

The threads routine 20*d*, using some of the functionality of the mutex routine 20*j*, enables COBOL language programmers to operate COBOL programs as threads by employing them as subtasks. Further, the threads routine 20*d* eliminates the negative effects of autonomous subtasks writing to the shared resource 56, such as SYSOUT, which would otherwise create potential for system errors and instability. The threads routine 20*d* allows for asynchronous processing simultaneously as opposed to the traditional COBOL tops-down programming approach.

Employing the threads routine 20*d*, COBOL programmers can now break-up large database file reading operations into multiple threads to read through large files and databases much more rapidly and efficiently. Enabling this functionality required, among other things, identifying the differences between mainframe COBOL programming and threads as natively used in languages such as C or Java. For example, threads natively share, for example, address space, process, memory and file space as well as returning a message in the event a thread abruptly terminates. To enable threads for COBOL, the technical layer 10 uses subtasks. COBOL was not previously operable to support subtasks in this manner. Subtasks use the same address space, have distinct process IDs, and share memory, but not file space. As discussed above, subtasks do not provide notification when they abnormally terminate. The threads routine 20*d* must manage these and other aspects of subtasks. In the present embodiment, the threads routine 20*d* of the technical layer 10 uses, among other techniques, subtasks to accomplish the thread functionality that is natively supported in computer languages such as C or Java.

Semaphores and Mutexes

Figure 5:
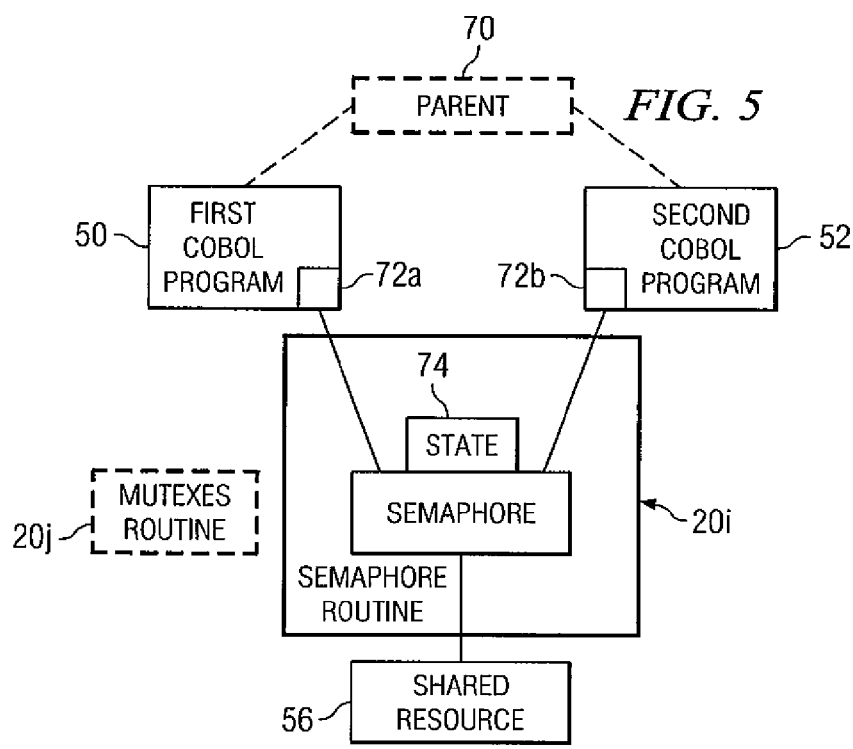
FIG. 5 is a block diagram illustrating one embodiment of a semaphore routine of the technical layer for enabling semaphores in COBOL programs.

FIG. 5 illustrates a portion of the technical layer 10 operable for coordinating processing in COBOL programs using semaphores and mutexes. Semaphores allow processing across jobs, such as between or across separate programs, while mutexes allow processing across threads, or inside of programs. These functions are further operable to synchronize these processes. The semaphore routine 20*i* is illustrated communicating with the first and second COBOL programs 50 and 52 which may be independent programs or routines. In the present embodiment, the first and second COBOL programs 50 and 52 are subroutines or subtasks of a parent COBOL program 70.

The technique for coordinating processing in COBOL programs includes the first and second COBOL programs 50 and 52 having a first and second routines 72*a* and 72*b*, respectively, for processing. The semaphore routine 20*i* is callable by the first and second COBOL programs 50 and 52 and maintains a shareable state 74 to coordinate the processing of the first and second routines 72*a* and 72*b*. For example, the first COBOL program 50 calls the semaphore routine 20*i* with an argument to lock the semaphore or state 74. Provided that the state 74 does not indicate that the semaphore is already locked, the semaphore routine 20*i* locks the semaphore. The state 74 may be a flag or other method for indicating that a shared process is in use.

Certain operations may only be accomplished in a serial manner without causing system errors or instability. For example, writing to the shared resource 56 by multiple programs simultaneously may cause errors. The semaphore routine 20*i* addresses this problem, according to the present embodiment, by associating the particular operation or job with a state or flag that is shareable between programs. Thus, when the second COBOL program 52 initiates the same process and attempts to lock the semaphore related to a particular operation, the semaphore routine 20*i* will indicate that the state 74 is locked and the processing of the second routine 72*b* goes into an event wait state.

The second COBOL program 52 and/or second routine 72*b* polls the semaphore routine 20*i* to determine the status of the shareable state 74. Once the semaphore is unlocked, as indicated by the shareable state 74, then the second routine 72*b* begins processing. In this manner, the semaphore routine 20*i* prevents multiple routines from processing to the shared resource 56 to prevent conflicts, errors, or other instabilities caused when multiple processes simultaneously write to an output or shared resource, such as SYSOUT.

Once the semaphore is locked, the semaphore then processes the job to the shared resource 56, such as shared memory, a file, a block of memory that is not shareable, a database, or other shared resource 56. In the present embodiment, the semaphore routine 20*i*, when called by the first or second COBOL programs 50 and 52, creates the shared semaphore and associates a shareable state 74 with the created semaphore. The semaphore routine 20*i* is operable to create and manage a plurality of semaphores related to various operations and maintain multiple shareable states 74 each associated with one of the created semaphores. In addition, the semaphore routine 20*i* is operable to create and share semaphores between a plurality of COBOL programs such as a third and fourth COBOL programs (not shown), while the first and second COBOL programs 50 and 52 use the same or another semaphore.

The semaphore routine 20*i* is provided with a plurality of functionality for maintaining semaphores including: creating a semaphore, obtaining an identifier related to the semaphore, identifying the semaphore, querying to determine whether the shareable state 74 indicates that the semaphore is locked, changing the status of the shareable state 74 to indicate that the semaphore is locked, as well as changing the status of the shareable state 74 to indicate the semaphore is unlocked and available. Additional functionality includes obtaining a process identification or ID number to determine the process associated with the semaphore and removing the semaphore from the computer system.

In other embodiments, the first and second COBOL programs 50 and 52 are operable to independently determine the status of the shareable state 74, as well as other processes associated with semaphore routine 20*i*. In still other embodiments, the first and second COBOL programs 50 and 52 only process a request to the semaphore routine 20*i*, which in turn returns the information requested by the first and second COBOL programs 50 and 52.

The construction and function of the mutex routine 20*j* is substantially similar to that of the semaphore routine 20*i* and the differences are based primarily on the characteristics of mutexes. Specifically, the semaphore routine 20*i* manages jobs which are processed in separate address space and which work across various jobs. The mutex routine 20*j*, on the other hand, manages the coordination of processing within subtasks using the same address space. In any event, the semaphore and mutex routines 20*i* and 20*j* provide a mutually exclusive capability to lock the semaphore or mutex by a first process which causes the second process to suspend or wait until the semaphore or mutex becomes available. This functionality prevents multiple jobs from simultaneously updating the shared resource 56.

The semaphores and mutexes routines 20*i* and 20*j* provide the COBOL language and COBOL developers additional programming capabilities by managing asynchronous processes to prevent multiple process, tasks, or jobs from updating the same shared resource 56 at the same time. In the present embodiment, the semaphore routine 20*i* and mutex routine 20*j* enable this functionality by making the appropriate calls to the operating system. In the present embodiment, the semaphores and mutexes routines 20*i* and 20*j* are computer programs written in the COBOL programming language and the operating system calls are accomplished substantially as described above with respect to sockets.

Memory Queues and Message Queues

Figure 6:
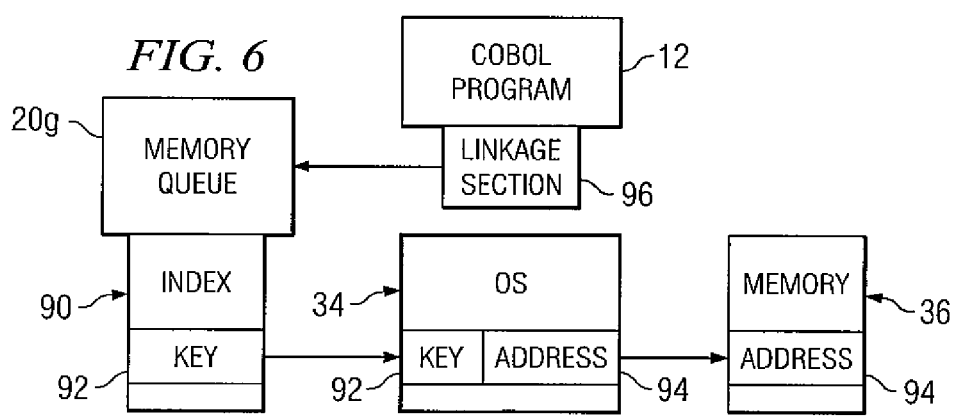
FIG. 6 is a block diagram, according to one embodiment, of a memory queue routine for enabling memory queues in COBOL programs.

FIG. 6 illustrates one embodiment of the memory queue routine 20*g* of the technical layer 10 for enabling queues in COBOL programs. The memory queue routine 20*g* maintains an index 90 having one or more keys 92 to manage the memory 36 of the computer 14. The memory queue routine 20*g* communicates with the operating system 34 to retrieve an address 94 in memory 36 based on the key 92. The operating system 34 maintains the key 92 related to the address 94 of the memory 36 wherein the relevant information and data is stored. The COBOL program 12 includes a linkage section 96, which is a standard portion of a COBOL program that is ordinarily used to receive data that is passed in from other programs. The COBOL program 12 communicates with the memory queue routine 20*g* to receive the address 94 of the memory 36.

In the present embodiment, the COBOL program 12 includes an identifier associated with the key 92, such as an alphanumeric identifier or name used by the COBOL program 12 to call the memory queue routine 20*g*. The memory queue routine 20*g* looks up the identifier or name in the index 90 and obtains the associated key 92. In the manner described above, the memory queue routine 20*g* obtains the address 94 in memory 36 related to the key 92 and returns the address 94 to the COBOL program 12.

In one embodiment, the COBOL program 12 makes a linkage call by name to the memory queue routine 20*g* requesting the address 94 in memory 36 for a particular memory queue to be used. The memory queue routine 20*g* looks up the name in the index to return the address 94 to the linkage section 96 of the COBOL program 12. By mapping the linkage section 96 of the COBOL program 12 to the address 94, the COBOL program 12 resolves the data at the address 94 of the memory 36 to the linkage section 96 of the COBOL program 12. Thus, the COBOL program 12 considers the information stored in memory at the address 94 as local and accessible to the COBOL program 12. This technique is effective to enable memory queues for the COBOL programming language.

The memory queue routine 20*g* is operable to serialize the information in the memory queue in various orders, including in last-in-first-out order. In some instances, it may be useful for the memory queue routine 20*g* to coordinate reading and writing information in a first-in-first-out order. The memory space at the address 94 is operable for a memory queue and the memory queue routine 20*g* coordinates, or in some instances may directly or exclusively control, the reading and writing of information to prevent conflicts in the memory queue.

In the present embodiment, the memory queue routine 20*g* is programmed in the COBOL programming language and the memory queue is enabled via a call to the operating system by the memory queue routine 20*g*. As such, the operating system 34 creates and enables the memory queue for use by the COBOL program, via the memory queue routine 20*g*.

The construction and function of the message queue routine 20*h* is substantially similar to that of the memory queue routine 20*g* illustrated in FIG. 6. When the message queue routine 20*h* is employed in lieu of the memory queue routine 20*g*, the memory space located at the address 94 is operable for a message queue. In this embodiment, the message queue routine 20*h* receives the request from the COBOL program 12 to read and write information to the message queue. In one embodiment, the message queue routine 20*h* coordinates the reading and writing of information to the message queue in a last-in-first-out order, while in still other embodiments the order is first-in-first-out.

The message queue functionality is enabled by the message queue routine 20*h* via a call to the operating system 34, as discussed above. As is the case with the memory queue routine 20g, the message queue routine 20h includes a plurality of functions to manage message queues including a create function to create new queues such as by initiating an appropriate operating system call. Other functions include an attach function for connecting to existing queues and a query function to determine whether a queue exists and obtain the size of the queue in terms of the number of rows as well as additional information related to the queue. Some other functions of the message queue routine 20h include a push function to add a row to the queue and a block function to block when the queue is full. A pop function removes the top row from the queue and also prevents this operation when no more rows exist on the queue. Additional functions provide for detaching from an existing queue and removing the queue from the system.

The functions of the message queue routine 20h and memory queue routine 20g may be called directly from the COBOL program 12, or routines 20 in the technical layer 10 provided as a library linkable to the COBOL program 12, as previously discussed above. In another embodiment, the functionality of the memory queue routine 20g may be enabled as a message queue by providing a socket layer around the memory queue. Also, the message queue routine 20h is operable to maintain the address 94 of memory 36 as a fixed size and block when the memory 36 is full, such as by employing semaphores. Similarly, pushing data onto the queue may require serialization so that processes, such as multiple subtasks do not simultaneously insert data into the same point in the queue, or address space 94 of memory 36. This serialization may be enabled as part of the message queue routine 20h, for example.

In the present embodiment, it may be useful on the input side for records to be maintained by only one job or process at a time as opposed to multiple jobs. While on the output side, data may be preferably coming out of only one process as opposed to multiple processes for the purposes of serializing the process. The message queue routine 20h and memory queue routine 20g provide new capability to the COBOL programming language and COBOL developers, by providing queue functionality for multiple COBOL programs and processes.

Shared Memory

Figure 7:
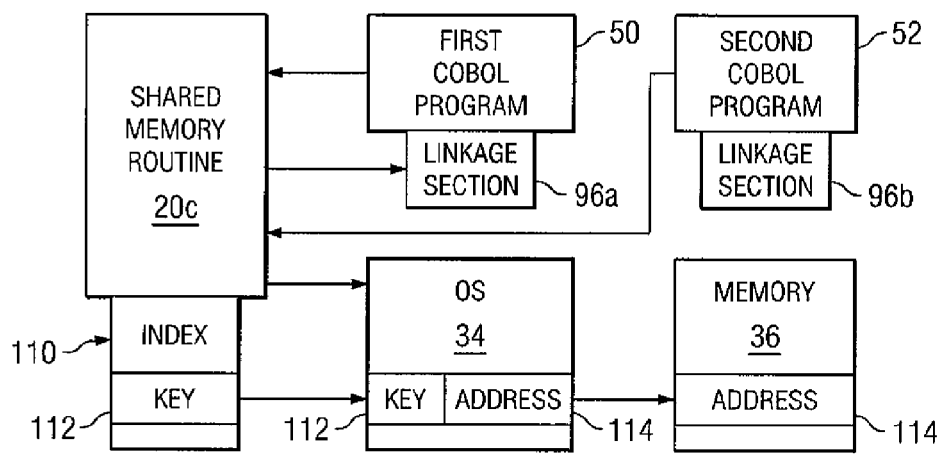
FIG. 7 illustrates one embodiment of a shared memory routine of the technical layer for enabling shared memory in COBOL programs.

FIG. 7 illustrates one embodiment of the shared memory routine 20c for sharing memory between COBOL programs. The shared memory routine 20c is provided with an index 110 for maintaining a plurality of keys 112 related to an address 114 in memory 36 that is used as shared memory by the first and second COBOL programs 50 and 52. The first COBOL program 50 requests shared memory from the shared memory routine 20c. The shared memory routine 20c includes a plurality of functions operable for managing shared memory, including a create function for creating a shared memory block. In the present embodiment, the shared memory routine 20c is a COBOL program that issues a call to the operating system 34 to allocate the appropriate amount of memory.

By providing the shared memory routine 20c as a COBOL library, the first COBOL program 50 may be compiled to enable this functionality. The amount of memory needed by the first COBOL program 50 is designated by the first COBOL program 50 at compile time. Based on the call from the shared memory routine 20c, the operating system 34 allocates the memory required for the working storage section of the first COBOL program 50. The operating system obtains the address 114 for the designated memory 36 to be shared between the COBOL programs. The first COBOL program 50 identifies the shared memory 36 using an identifier, such as an alphanumeric identifier or name, for example. Once the shared memory has been identified, the first COBOL program 50 can begin using the shared memory 36 via a request to the shared memory routine 20c.

The shared memory routine 20c maintains the identifier in the index 110 along with the associated key 112. The shared memory routine 20c uses the key 112 to issue a request to the operating system for the address 114 in memory 36 that will be shared. The operating system 34 passes the address 114 back to the shared memory routine 20c which in turn passes the address 114 back to the linkage section 96a of the first COBOL program 50.

As previously discussed, the linkage section 96a of the first COBOL program 50 is typically used for passing information between subprograms or calling programs, but is employed in a novel manner in the present embodiment to map to the address 114 of the memory 36 that is used for shared memory. Mapping the address 114 to the linkage section 96a of the first COBOL program 50 is useful since shared memory only needs to be loaded one time and does not require constant refreshing. For example, data space is known as a section of mainframe memory that stays resident when programs exit, but requires a task running to keep the memory refreshed. Core loads are another example of memory employed in mainframe computer systems, but when the program using the memory exits or closes, the memory is released and the data is no longer available. Employing the shared memory routine 20c according to the present aspect, the memory is maintained by the shared memory routine 1c even after the first COBOL program 50 terminates.

The second COBOL program 52, using the same identifier or name, requests the address 114 in memory 36 where the shared memory is located. The shared memory routine 20c returns the address 114, in a similar manner, based on the use of the same identifier or name. The address 114 of the shared memory is mapped back to the linkage section 96b of the second COBOL program 52 thereby creating a shared block of memory useable by both the first and second COBOL programs 50 and 52.

The shared memory routine 20c is operable to manage multiple shared memory blocks based on a unique name or identifier associated with the each address 114 of the array in memory 36. The shared memory blocks can then be accessed by numerous COBOL programs, via the shared memory routine 20c, by referencing the unique identifier. A number of techniques for managing the unique identifiers, or associating, organizing or referencing memory blocks by and between COBOL programs may be used since the present system is not limited to any particular implementation. In addition to those functions previously described, the shared memory routine 20c includes an attach function to attach to an existing block of memory, a detach function to detach from an existing block of memory, a remove function to remove a shared memory block from the system, and a query function to determine whether a shared block of memory exists and obtain the size and other information about the shared memory block.

In other embodiments, the shared memory routine 20c may be provided with one or more indexes 110 for maintaining identifiers and keys 112, each of which may be queried by the COBOL programs. In one embodiment, the shared memory routine 20c monitors the shared memory when the memory is protected to prevent the shared memory from being overwritten. In yet other embodiments, the memory may be unprotected and the shared memory routine 20c may allow the COBOL programs to read and write from memory in an unrestricted manner. A number of techniques may be employed for managing the protection and privileges of shared memory and are within the spirit and scope of the present disclosure.

In the present embodiment, the shared memory routine 20c manages the protected and unprotected aspects of the shared memory by virtue of the specific operating system call. For example, the type of call dictates the way the operating system 34 will manage the protection of the block of memory 36 used for shared memory. In any event, the shared memory routine 20c enables the COBOL language to be programmed for memory sharing between COBOL programs enabling a new level of functionality in COBOL language programs.

Signal Handlers

Figure 8:
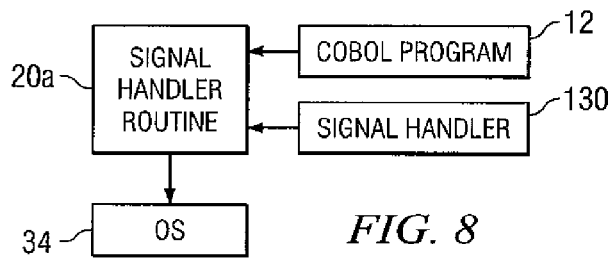
FIG. 8 is a block diagram illustrating a signal handler routine for implementation in COBOL programs, according to one embodiment.

FIG. 8 is a block diagram illustrating the signal handler routine 20a to enable COBOL programs to use signal handlers. The signal handler routine 20a operably communicates with the COBOL program 12 to receive a signal handler 130 designated by the COBOL program 12 to execute based on an event. The signal handler routine 20a registers the signal handler 130 with the operating system 34 so that the operating system 34 executes the signal handler 130 on the event.

When, for example, the operating system detects that a program ABENDS (abnormal end), or otherwise detects an error, the operating system issues an event. A number of handlers are operable to launch specific processes when these events occur. For example, specific programs such as the signal handler 130 can be registered with the operating system and executed on the registered event. The signal handler routine 20a is operable to register programs, such as the signal handler 130, with the operating system 34 for execution on such events. The signal handler routine 20a is not limited to input-output error or events and may also register programs to be executed for memory exceptions, program protection violations, and other events.

The signal handler routine 20a is further operable to initiate a separate thread for execution of the signal handler 130 when the event occurs. The signal handler routine 20a identifies the program name or other identifier of the signal handler 130. The signal handler routine 20a registers this name with the operating system 34 and associates the name with a desired event. The signal handler routine 20a enables the signal handler functionality for COBOL programs by, for example, an operating system call. In the present embodiment, the signal handler routine 20a is a COBOL language program employed by the COBOL program 12 as a library that makes the operating system call, similar to that described above. In the present embodiment, the signal handler 130 may be any program, such as a notification program registered with the operating system that provides relevant notice on the registered event. The signal handler 130 may be programmed to correct, recover, terminate, or take other action based on the event.

The signal handler routine 20a is operable to maintain a log of processes, such as in a shared block of memory, to track the processes operating on the computer 14. When a particular event occurs the log can be queried to determine the last process or program operating. In this manner, the signal handler routine 20a is operable to not only handle events from the operating system which executes signal handlers on the events, but also to track the processes to help identify the relevant processes or programs that triggered the event and the signal handler 130. This functionality is useful for debugging programs, for example, since the program or process that generated the error is typically identifiable from the log. Further, programs that generate erroneous data or output are also readily identifiable since the program and the output may be logged and reviewed.

In some embodiments, the signal handler routine 20a is operable to register multiple signal handlers 130 related to one or more operating system events. The signal handler routine 20a may be further operable to enable the COBOL program 12 to directly register the signal handlers 130 with the operating system 34.

Events

Figure 9:
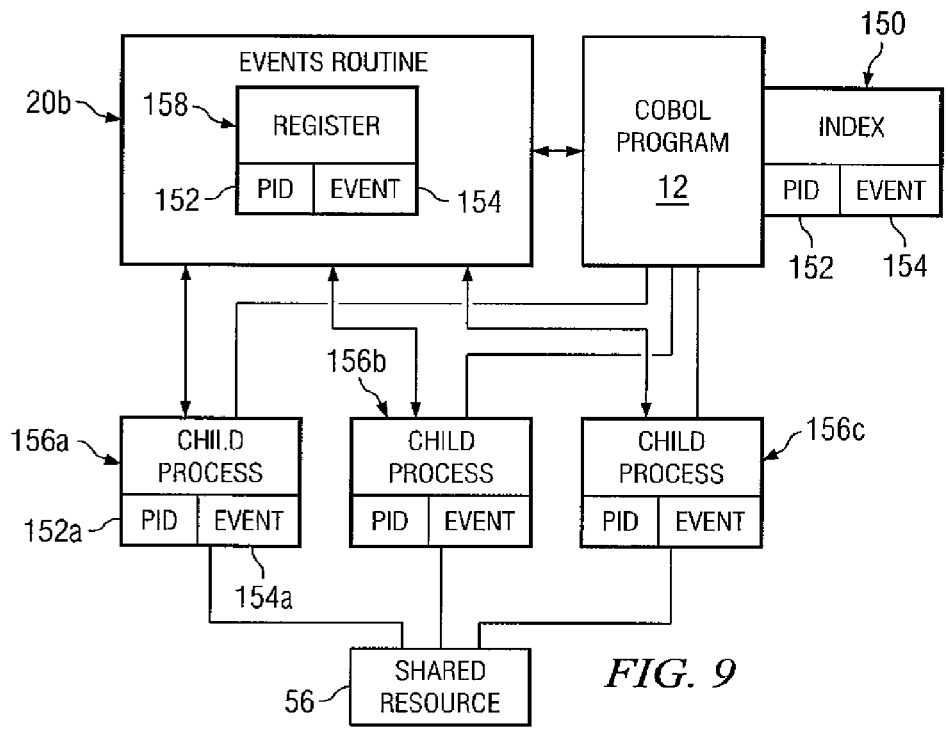
FIG. 9 illustrates one embodiment of an events routine of the technical layer for enabling events in COBOL programs.

FIG. 9 illustrates the function and operation of the events routine 20b to enable events in COBOL programs. The events routine 20b is operable to allow COBOL programs to perform asynchronous processing and further to coordinate request handling across multiple child processes. The COBOL program 12 maintains an index 150 including a process identification number or PID 152 and an event 154 associated with each of a plurality of child processes 156. The child processes are designated alphanumerically as child processes 156a, 156b, and 156c. The child processes are subtasks, subprograms, or subroutines of the parent program, such as COBOL program 12. The child processes operate, in this embodiment, as threads which may be enabled by the threads routine 20d discussed above.

Signals

When the COBOL program 12 initiates the child process 156, such as child process 156a, the COBOL program 12 puts the child process 156a into an event wait. In this embodiment, the events routine 20b may place the child process 156a into the event wait. The child process 156a registers with the COBOL program 12 such that the PID 152 and event that the child process 156a is waiting on are recorded in the index 150 of the COBOL program 12. The COBOL program 12 may obtain a PID 152 and event 154 associated with the child process 156a on initializing or on starting the child process 156a or may obtain this information subsequently from the events routine 20b. In some cases, the child process 156a would not be required to register with the COBOL program 12.

In the present embodiment, the child process 156a registers with a register 158 of the events routine 20b. The register 158 maintains the PID 152 and event 154 associated with the child process 156a. The events routine 20b maintains the functionality to place the child process 156a, as well as the other child processes 156b and 156c, into the wait state upon request by the COBOL program 12.

At the appropriate time, the COBOL program 12 initiates the child process 156a by signaling the events routine 20b using the PID 152 and the event 154 associated with the desired process, such as the child process 156a. In some cases, the COBOL program 12 may only signal the child process 156a using the PID, via the events routine 20b. The events routine 20b receives the PID 152 from the COBOL program 12 and associates the event 154 with the PID 152 using the register 158. The events routine 20b then signals the appropriate child process, such as child process 156a, based on the PID 152.

The child process 156a is programmed to perform a process, such as outputting to a shared resource 56 or writing to memory, for example. The COBOL program 12 and the events routine 20b, via the index 150 and register 158, respectively, are operable to maintain a plurality of PIDs 152 and a plurality of events 154 associated with the one or more child processes 156. The events routine 20b is operable to coordinate signaling and processing of the child processes 156 to the shared resource 56.

The shared resource 56 may be, for example, a socket connection initially created by the COBOL program 12 via the sockets routine 20e. In some operating systems, only the process that creates the socket connection is able to use that connection. In this case, it may be useful for the COBOL program 12 to pass or assign the socket connection to the child process 156, for reasons of programming efficiency. To coordinate the transfer of, for example, a socket connection requires a synchronized transfer. The events routine 20b is operable to synchronize such a transfer. In this example, the COBOL program 12 created the shared resource 56 or socket connection and has ownership of the socket connection until it is otherwise assigned.

Typically the operating system of a mainframe computer, for example, designates the shared resource 56, or socket connection, to the COBOL program 12 based on the PID of the COBOL program 12. The COBOL program 12 gives, via the events routine 20b, the shared resource 56 to the child process 156. The COBOL program 12 then enters into an event wait until receiving a response from the child process 156. The child process 156 receives or takes the shared resource 56 from the COBOL program 12 and signals the COBOL program 12 that the take has been completed. The giving and taking of the shared resource 56, in this manner, may be accomplished via one or more operating system calls from the events routine 20b to the operating system to transfer the PID designated for the shared resource 56.

Socket connections, as well as other shared resources 56 may be transferred between the creating resource and other subtasks, threads, routines, or subprograms to provide additional functionality to the COBOL programming language. In the present embodiment, the events routine 20b is a COBOL program maintained in a library linkable to the COBOL program 12. Similar to the manner described above, the calls to the operating system that accomplish the giving and taking of the shared resource are accomplished by COBOL language program calls to the operating system. It will be appreciated that, depending upon the particular operating system where the technical layer 10 is employed, coordination of taking and giving shared resources can be problematic and, if not synchronized properly, can cause errors and system instability.

In some other embodiments, the child process 156 signals the COBOL program 12, via the events routine 20b, to signal that the child process 156 has received or taken the shared resources. In alternate embodiments, the child process 156 signals the COBOL program 12 directly. The events routine 20b of the technical layer 10 provides additional functionality to the COBOL language to allow for asynchronous and distributed processing and the coordination of event handling across various child processes which was not previously available to COBOL developers. This functionality also provides COBOL applications the ability to use both semaphores and mutexes in conjunction. For example, the semaphore routine 20i can be used to process, synchronize, stop, and start across jobs or programs, while the mutex routine 20j can be used to process synchronize, stop and start across threads within these programs.

Figure 10:
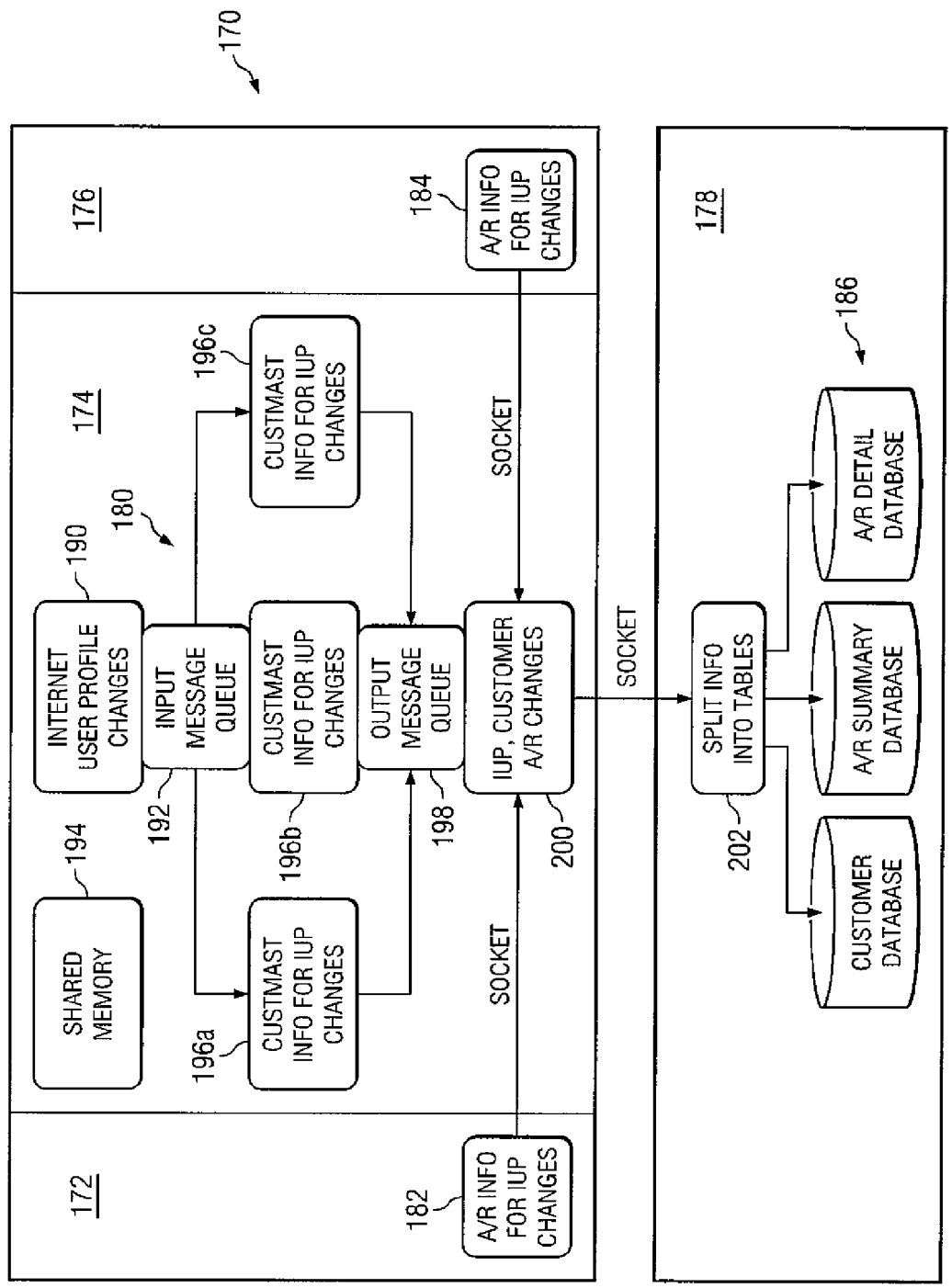
FIG. 10 is a block diagram of an exemplary system illustrating implementation of various distributed and asynchronous processes for COBOL, according to another embodiment.

FIG. 10 is a block diagram of an exemplary system illustrating use of distributed and asynchronous processing in COBOL to parallelize and distribute work. The system 170 is provided only as an exemplary implementation of the technical layer 10 using COBOL language programs. Alternative changes, modifications, and techniques may also be employed for systems requiring different or additional functionality. The system 170 includes a first machine 172, a second machine 174, a third machine 176 and a fourth machine 178. The machines 172-178 may be computer systems such as mainframe computer systems, mid-range computer systems, networks and/or desktop computer systems.

In the present embodiment, the first through third machines 172-176 are mainframe computer systems and the fourth machine 178 is a mid-range computer system. The second machine 174 is provided with a customer interface 180 for managing, for example, internet user profiles. The information for the internet user profiles may be stored, for example, in a customer master file or CustMast file (not shown). Accounts receivable information for the internet user profile may be maintained in a first A/R file 182 provided on the first machine 172. Additional account receivable information for the internet user profile may be maintained in a second A/R file 184 maintained on the third machine 176. The first and second A/R files 182 and 184 may also represent applications having access to databases wherein the relevant information is stored.

A plurality of databases 186 stored on the fourth machine 178 maintain a more detailed record of customer information stored as one or more database files or databases. The customer interface 180 is a COBOL application, which may be one or more COBOL programs, routines, or subroutines enabled via the technical layer 10 for gathering customer data to be stored in the databases 186 on the fourth machine 178. The customer interface 180 is operable to retrieve customer information for reporting and other purposes, for example, on thousands of customers whose information is maintained in the customer master file.

The customer interface 180 may be comprised of a plurality of COBOL programs including a profile changes program 190. The profile changes program 190 is operable using the message queue routine 20h of the technical layer 10 to employ a message queue 192. The profile changes program 190 using the shared memory routine 20c is operable to establish a shared memory 194 on the second machine 174. To quickly and efficiently read thousands of records from the customer master file, the profile changes program 190 is operable, using the technical layer 10, to spawn a plurality of jobs 196 designated alphanumerically 196a, 196b, and 196c. Processing the separate jobs 196 may be accomplished, for example, using the semaphore routine 20i, as described above. In this manner, the profile changes program 190 breaks up access to the customer master file into multiple jobs to improve the efficiency of accessing the customer master information.

Each of the jobs 196 operates in its own address space, but is able to share the shared memory 194. As each of the jobs 196 is started, the jobs 196 look at the shared memory 194 to obtain the key with the location to the message queue 192, such as elsewhere in memory. The jobs 196 then take the first message off the message queue 192 and process the message or instruction. The job 196 then, for example, pulls or reads records off the customer master file and puts or writes the information to an output queue 198. The profile changes program 190, via the technical layer 10, is operable to monitor and manage the message queue 192 to provide the jobs 196 with messages or work. The shared memory 196 is used to communicate across the jobs 196 any information to be shared between the jobs 196.

An A/R changes program 200 is a COBOL program or routine that is operable to read information from the output queue 198 as written from the jobs 196. The A/R changes program 200 may be a program or routine that is part of the customer interface 180. The A/R changes program 200, in this example, requires information from the first and second A/R files 182 and 184 to complete processing. Rather than route jobs one-at-a-time and waiting until the process is returned, the A/R changes program 200 is operable, using the technical layer 10, to do a socket connection request directly to the relevant A/R customer data. Specifically, the A/R changes program 200, using the sockets routine 20e, is operable to enable socket communication to the first A/R file 182 on the first machine 172 and further operable to retrieve information from the second A/R file 184 on the third machine 176 via a socket request.

The A/R changes program 200 combines the information from the output queue 198 received from the jobs 196 with the associated data from the first and second A/R files, received via the socket connections. The A/R changes program 200 then outputs the combined information or data to program 202 or system on the fourth machine 178, via an additional socket communication. The output to the fourth machine 178 may be performed using, among other functions, the semaphore routine 20i. The program 202 is operable to appropriately divide and store the data into the databases 186.

The system 170 illustrated in FIG. 10 is an example of the functionality that the technical layer 10 provides to COBOL language programmers to enable asynchronous and distributed processing. Although the system 170 does not specifically employ all the routines 20 of the technical layer 10, the system 170 is illustrated to provide insight into the vast new capabilities enabled for the COBOL language by the present disclosure. While the technical layer 10 is used as a library in this example, the asynchronous and distributed COBOL functions disclosed herein, as previously discussed, may also be enabled via a pre-compiler, a compiler, or by directly programming the system 170 for this functionality.

While several embodiments have been provided in the present disclosure, it should be understood that the implementation of distributed and asynchronous processing in COBOL may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by on skilled in the art and could be made without departing from the spirit and scope disclosed herein.

What is claimed is:

1. A system for employing semaphores or mutexes to coordinate processing in COBOL programs, comprising:
   a first COBOL program recorded on a non-transitory computer-readable medium having a first routine for processing;
   a second COBOL program recorded on a non-transitory computer-readable medium having a second routine for processing; and
   a COBOL technical layer recorded on a non-transitory computer readable medium callable by the first and second COBOL programs, the COBOL technical layer maintaining a state sharable between the first and second COBOL programs to coordinate the processing of the first and second routines, wherein the COBOL technical layer coordinates the processing of the first and second routines through a bit level call to an operating system, and wherein the COBOL technical layer further creates a semaphore, obtains an identifier identifying the semaphore, queries to determine whether the state indicates that the semaphore is locked, changes the state to indicate that the semaphore is locked, changes the state to indicate that the semaphore is unlocked, obtains a process identification number to determine a process associated with the semaphore, and removes the semaphore from a computer system.

2. The system of claim 1, wherein the COBOL technical layer is further defined as a COBOL library having routines callable from the first and second COBOL programs.

3. The system of claim 1, wherein the COBOL technical layer is further defined as a COBOL callable routine.

4. The system of claim 1, wherein the COBOL technical layer is integral to the first and second COBOL programs.

5. The system of claim 1, wherein the COBOL technical layer is further defined as COBOL compiler enabled.

6. The system of claim 1, wherein the COBOL technical layer is further defined as a COBOL pre-compiler program used by the first and second COBOL programs.

7. The system of claim 1, wherein the first and second routines are further defined as a first and second jobs and wherein the first and second COBOL programs analyze the state maintained by the COBOL technical layer to resolve the processing of the first and second jobs.

8. The system of claim 1, wherein the COBOL technical layer initiates a first state when the first routine is processing such that the second routine postpones processing in response to the first state of the COBOL technical layer.

9. The system of claim 1, wherein the COBOL technical layer is operable to maintain a plurality of states based upon a task of the first and second routines.

10. The system of claim 1, further comprising:
    a third COBOL program recorded on a non-transitory computer-readable medium having a third routine for processing;
    a fourth COBOL program recorded on a non-transitory computer-readable medium having a fourth routine for processing, wherein the third and fourth routines are further defined as a third and fourth threads; and
    a second COBOL technical layer recorded on a non-transitory computer-readable medium callable by the third and fourth COBOL programs, wherein the second COBOL technical layer maintains a state sharable between the third and fourth COBOL programs to coordinate the processing of the third and fourth threads.

11. The system of claim 10, wherein the third and fourth threads process in a same address space in a computer system.

12. The system of claim 1, wherein the first and second routines are further defined as a first and second jobs and wherein the COBOL technical layer maintains the state sharable between the first and second COBOL programs to coordinate the processing of the first and second jobs.

13. The system of claim 12, wherein the first and second jobs process in separate address space in a computer system.

14. A method for employing semaphores or mutexes to coordinate processing in COBOL programs, comprising:
    processing by a first COBOL program to a shared resource;

processing by a second COBOL program to the shared resource;

maintaining, by a COBOL technical layer, a state sharable between the first and second COBOL programs to coordinate the processing by the first and second COBOL programs to the shared resource, wherein the COBOL technical layer coordinates the processing by the first and second COBOL programs through a bit level call to an operating system;

creating a semaphore, by the COBOL technical layer;

obtaining an identifier identifying the semaphore;

querying to determine whether the state indicates that the semaphore is locked;

changing the state to indicate that the semaphore is locked;

changing the state to indicate that the semaphore is unlocked;

obtaining a process identification number to determine a process associated with the semaphore; and removing the semaphore from a computer system.

15. The method of claim 14, wherein the state is further defined as a flag.

* * * * *